US011976506B2

(12) United States Patent
Katt

(10) Patent No.: US 11,976,506 B2
(45) Date of Patent: May 7, 2024

(54) DUAL SENSOR MODULE FOR A GARAGE DOOR

(71) Applicant: Dallin Katt, Loves Park, IL (US)

(72) Inventor: Dallin Katt, Loves Park, IL (US)

(*) Notice: Subject to any disclaimer, the term of this patent is extended or adjusted under 35 U.S.C. 154(b) by 494 days.

(21) Appl. No.: 17/185,288

(22) Filed: Feb. 25, 2021

(65) Prior Publication Data

US 2022/0268075 A1 Aug. 25, 2022

(51) Int. Cl.
*E05F 15/43* (2015.01)

(52) U.S. Cl.
CPC ........ *E05F 15/43* (2015.01); *E05F 2015/436* (2015.01); *E05Y 2900/106* (2013.01)

(58) Field of Classification Search
CPC ..... E05F 15/43; E05F 2015/436; E05F 15/73; E05F 2015/765; E05Y 2900/106; E05Y 2800/21; G01S 13/56
See application file for complete search history.

(56) References Cited

U.S. PATENT DOCUMENTS

| | | | | | |
|---|---|---|---|---|---|
| 4,922,168 | A * | 5/1990 | Waggamon | E05F 15/43 | 318/275 |
| 5,266,793 | A * | 11/1993 | Smith | H03F 3/087 | 250/221 |
| 5,428,923 | A * | 7/1995 | Waggamon | E05F 15/43 | 340/650 |
| 5,465,033 | A * | 11/1995 | Fassih-Nia | E05F 15/43 | 318/17 |
| 6,243,006 | B1 * | 6/2001 | Rejc | E06B 9/82 | 160/133 |
| 6,750,441 | B2 * | 6/2004 | Imahori | E05F 15/43 | 250/221 |

FOREIGN PATENT DOCUMENTS

JP S61198086 A * 9/1986

* cited by examiner

*Primary Examiner* — Jennifer D Bennett
(74) *Attorney, Agent, or Firm* — Reinhart Boerner Van Deuren P.C.

(57) ABSTRACT

A dual sensor module for a garage door opener is provided. Embodiments of the dual sensor module include a plurality of input terminals for at least two sensors configured to detect an object in a path of a garage door. There is an output terminal for providing a signal to a motor control unit for the garage door opener wherein the signal prevents the garage door from closing when the object is in the path of the garage door.

16 Claims, 5 Drawing Sheets

DUAL SENSOR MODULE FOR A GARAGE DOOR

FIELD OF THE INVENTION

This invention generally relates to a sensor for a garage door opener.

BACKGROUND OF THE INVENTION

Automatic garage door openers have been around for a number of years. It is recognized that there may be some risk associated with a closing garage door. When inadvertently closed at the wrong time, property damage or even injury may result. As such, it would be advantageous to have a device designed to prevent closing of the door when personal property, a person, or an animal are in the path of the closing door.

Embodiments of the present invention provide such a device. These and other advantages of the invention, as well as additional inventive features, will be apparent from the description of the invention provided herein.

BRIEF SUMMARY OF THE INVENTION

In one aspect, embodiments of the invention provide a dual sensor module for a garage door opener. Embodiments of the dual sensor module include a plurality of input terminals for at least two sensors configured to detect an object in a path of a garage door. There is an output terminal for providing a signal to a motor control unit for the garage door opener wherein the signal prevents the garage door from closing when the object is in the path of the garage door. As described in this application, the phrase "in the path of a garage door" refers to the path of the garage door as it moves from an open position to a closed position.

In a particular embodiment, the aforementioned output terminal is configured to be electrically coupled to a motor control unit for the garage door. In some embodiments, each of the at least two sensors includes a sensor emitter and a sensor detector. In other embodiments, at least one of the at least two sensors is an optical sensor.

The dual sensor module may also include an LED for each of the at least two sensors in which the LED indicates whether the object is in the path of the garage door. In a further embodiment, the dual sensor module has a transient voltage suppression arrangement electrically coupled to the output terminal, the transient voltage suppression arrangement configured to protect the circuitry of the dual sensor module from voltage surges. The transient voltage suppression arrangement may have at least one Zener diode coupled between ground and the output terminal.

In certain embodiments, the dual sensor module includes a plurality of op-amps coupled respectively to each of the plurality of input terminals, wherein each of the plurality of op-amps functions as a buffer between the at least two sensors and a circuit of the dual sensor module. In more particular embodiments, each op-amp has an output coupled to a watchdog timer that is configured to detect a pulse from the op-amp output to which it is coupled, and wherein an output of the watchdog timer changes if the pulse is not detected.

The dual sensor module may further include circuitry configured to determine if the object is blocking one of the at least two sensors. Furthermore, the circuitry may include a data selector integrated circuit whose output is coupled to the output terminal. The dual sensor module may further include least one input terminal for the supply of electrical power to the dual sensor module.

In another aspect, embodiments of the invention provide a garage door sensor system having a dual sensor module that includes a plurality of input terminals for at least two sensors configured to detect an object in a path of a garage door. An output terminal provides a signal to a motor control unit for the garage door opener such that the signal prevents the garage door from closing when the object is in the path of the garage door. The system includes a first sensor emitter and a first sensor detector electrically coupled to one or more of the plurality of input terminals. A second emitter and a second sensor detector are electrically coupled to one or more of the plurality of input terminals not coupled to the first sensor emitter and first sensor detector. The first sensor emitter and first sensor detector are positioned at a first location along the path of the garage door, and the second emitter and second sensor detector are positioned at a second location along the path of the garage door, wherein the first location is different from the second location.

In particular embodiments of the invention, at least one of the plurality of input terminals is configured to connect to one or more wires coupled to the first sensor emitter and first sensor detector or to the second emitter and second sensor detector. Furthermore, the output terminal may be configured to connect to one or more wires coupled to a motor control unit for the garage door. In certain embodiments, the first sensor emitter and the first sensor detector form an optical sensor. In more particular embodiments, the second sensor emitter and the second sensor detector form an optical sensor.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Conventional automatic garage door openers typically include some type of sensor located no more than six inches from the ground. However, as many homeowners have discovered, it is possible to park a car, boat, recreational vehicle, some other type of vehicle, or personal property such that some portion is in the garage door path while clearing the sensor. In such a case, the garage door will contact and potentially damage those things in its path. Disclosed hereinbelow is a dual sensor module that provides the aforementioned lower optical sensor along with an upper optical sensor designed to prevent closing of the garage door when a vehicle or some personal property is in the garage door path but cannot be detected by the lower optical sensor.

Those of ordinary skill in the art will recognize that the solution to the above-described problem with conventional garage door openers is not as simple as adding another sensor. A common limitation of conventional garage door openers is that the control apparatus is designed to recognize signals from only one sensor. As such, conventional garage door openers do not function with a second sensor. Thus, to implement the dual sensor module, a new design was required.

Figure 1:
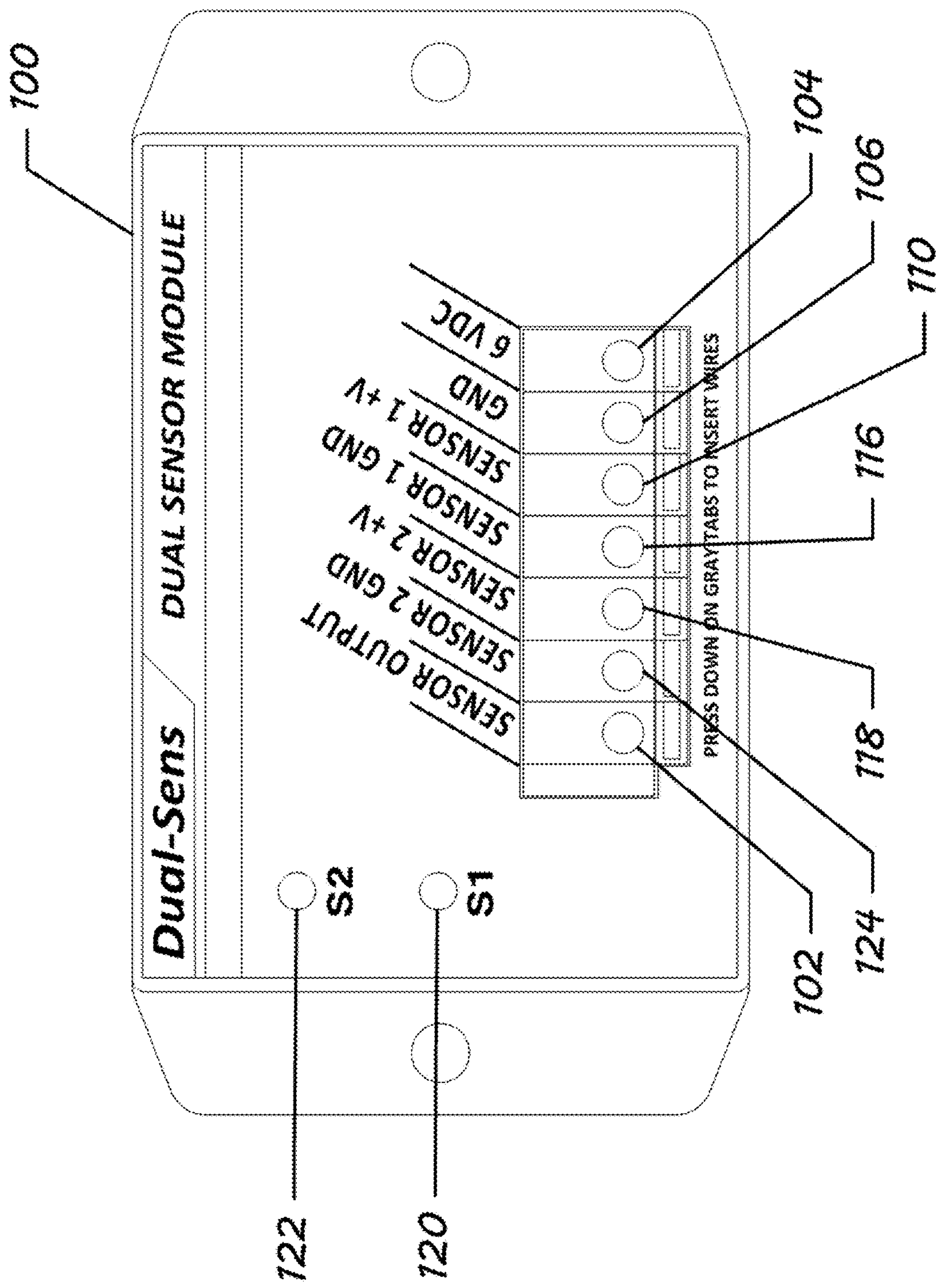
FIG. 1 is a plan view of an exemplary dual sensor module constructed in accordance with an embodiment of the invention.
Figure 2:
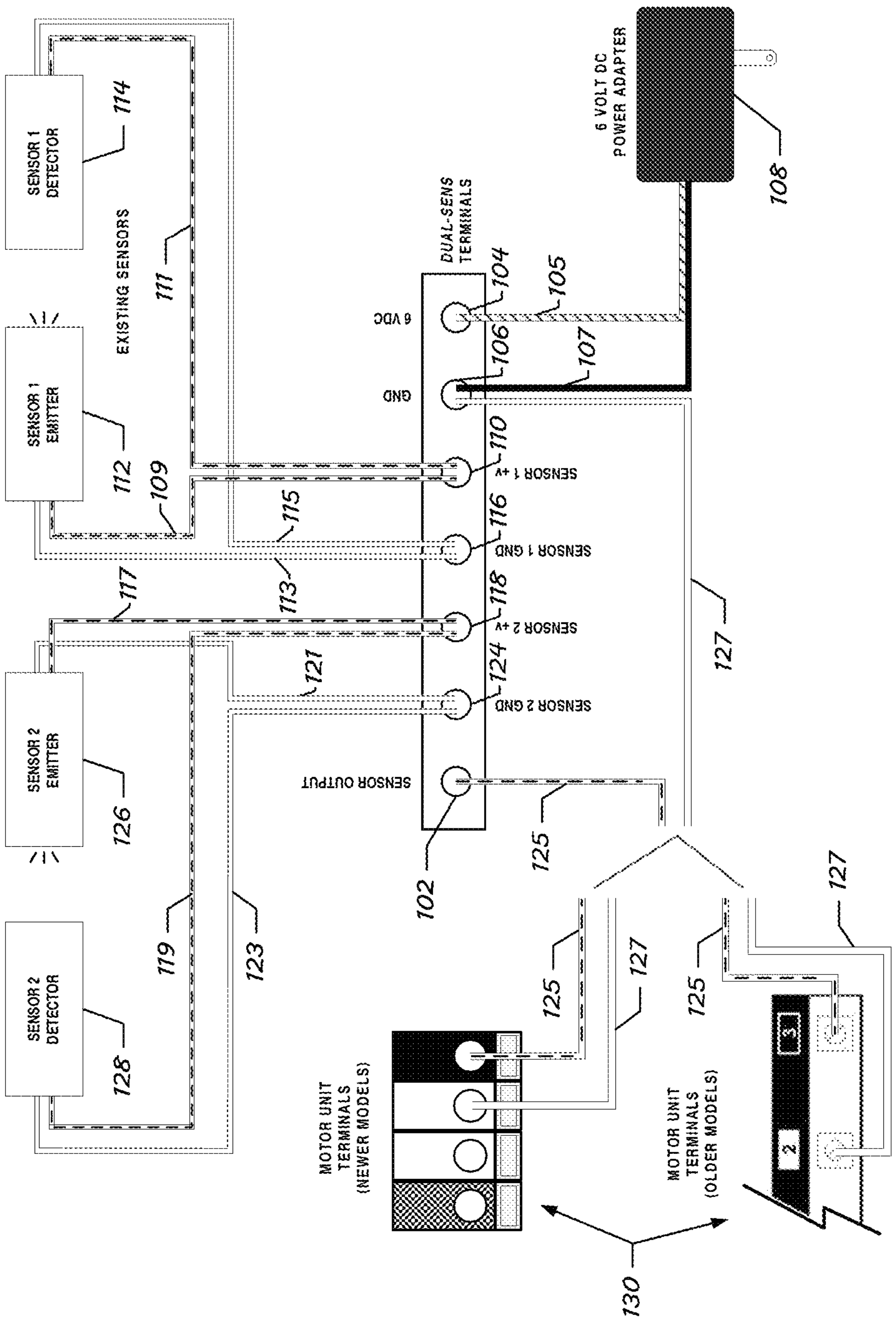
FIG. 2 is a schematic wiring diagram for a dual sensor module system incorporating the dual sensor module of FIG. 1, according to an embodiment of the invention.

FIG. 1 is a plan view of an exemplary dual sensor module 100 constructed in accordance with an embodiment of the invention, while FIG. 2 is a schematic wiring diagram for a garage door sensing system that incorporates the dual sensor module 100 and associated components. In the embodiment shown, the dual sensor module 100 includes six electrical input terminals and one output terminal 102. The first input terminal 104 is for a wire 105 from the DC voltage input to the dual sensor module 100, while the second input terminal 106 accommodates a wire 107 for the DC voltage input ground connection. The wires 105, 107 from first input terminal 104 and second input terminal 106 are connected to an electrical plug 108 (shown in FIG. 2) that provides power to the dual sensor module 100 when plugged into an electric socket. Embodiments of the dual sensor module 100, such as shown in FIG. 1, include a first sensor LED 120 to indicate whether the first sensor detector 114 (shown in FIG. 2) is being blocked, and a second sensor LED 122 to indicate whether the second sensor detector 128 (shown in FIG. 2) is being blocked.

Now referring to FIGS. 1 and 2, the third input terminal 110 is for two wires 109, 111 to the input voltage of the first sensor emitter 112, and the input voltage of the first sensor detector 114. The fourth input terminal 116 is for two wires 113, 115 to the ground connection for the first sensor emitter 112, and for the first sensor detector 114. As described hereinbelow, the sensor emitters and sensor detectors are optical sensors, though the scope of the invention does not necessarily limit the sensors to embody only optical sensors. As explained above, each pair of the sensor emitters and sensor detectors are configured to be positioned at some point or location along the path of the garage door as it moves from the open position to the closed position.

The fifth input terminal 118 is for two wires 117, 119 to the input voltage of the second sensor emitter 126, and the input voltage of the second sensor detector 128. The sixth input terminal 124 is for two wires 121, 123 to the ground connection for the second sensor emitter 126, and for the second sensor detector 128. The output terminal 102 accommodates a wire 125 that provides input voltage to a motor control unit terminal 130 for the garage door opener motor (not shown). As can be seen in FIG. 2, the motor control unit terminal 130 also accommodates a wire 127 for the ground connection between the motor control unit terminal 130 and the second input terminal 106.

In a particular embodiment of the invention, the dual sensor module 100 operates using its own low-voltage 6-volt DC power supply where the electrical plug 108 is a 6-volt DC power adapter that converts AC grid voltage to 6 volts DC. It is envisioned that alternate embodiments of the invention could use portable power supplies such as batteries, for example. The first sensor emitter 112 and the first sensor detector 114 are powered directly by the dual sensor module 100 instead of the garage door opener motor control unit.

Figure 3:
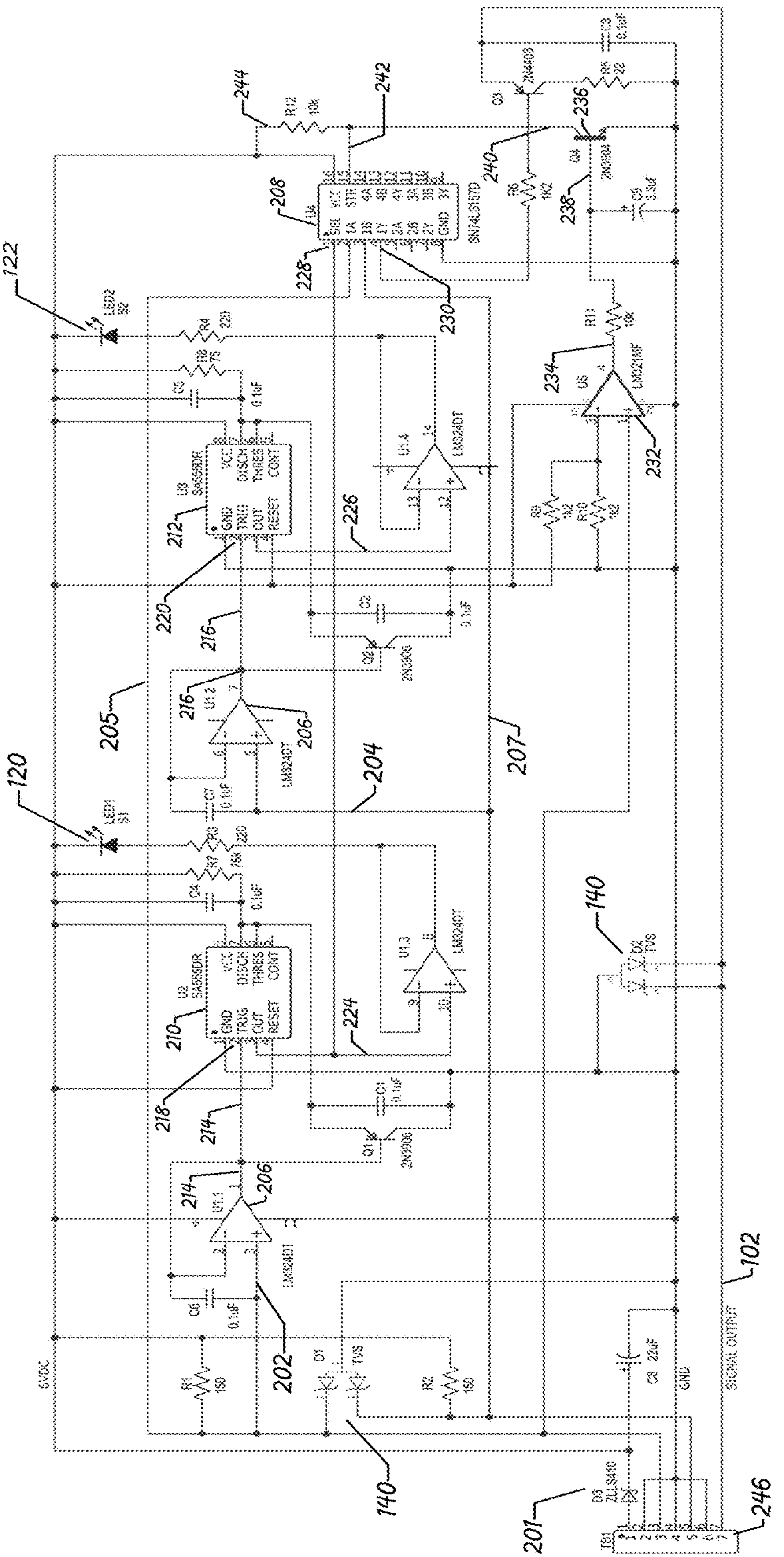
FIG. 3 is a schematic circuit diagram for the dual sensor module of FIG. 1, according to an embodiment of the invention.

FIG. 3 is a schematic diagram showing the circuitry of the dual sensor module 100 according to a particular embodiment of the invention. A pair of Transient Voltage suppression (TVS) and protection diodes 140 are provided to protect the circuitry of the dual sensor module 100, sensors 112, 114, 126, 128, and motor control unit from AC line voltage surges, lightning strikes, and mis-wiring. Specifically, as shown in FIG. 3, the Transient Voltage suppression system includes one or more Zener diodes connected between ground and the output terminal 102. A Zener diode 201, coupled between the first input terminal 104 and a capacitor coupled to circuit ground, provides reverse voltage protection for the dual sensor module 100.

Referring to FIG. 3, both first 202 and second 204 incoming sensor signals are each connected to an input of an op-amp 206. The op-amp 206 inputs are configured as a high-impedance unity-gain buffer. This reduces any current drain on the sensor signals to a very low level, ensuring that the sensors 112, 114, 126, 128 can operate without interference from the dual sensor module 100 itself. The first and second sensor signals 205, 207 are also connected to a two-line to one-line Data Selector Integrated Circuit (IC) 208. The dual sensor module 100 monitors the incoming sensor conditions of both sensor pairs 112-114, 126-128, and switches the appropriate sensor signal through the Data Selector IC 208 to the dual sensor module's output terminal 102.

In the embodiment of FIG. 3, the dual sensor module circuit includes two watchdog timer ICs configured as first and second watchdog timers 210, 212. There is one watchdog timer 210, 212 for each sensor pair 112-114, 126-128. The buffered sensor signal from each op-amp output 214, 216 is connected to the trigger input 218, 220 of each watchdog timer 210, 212. In a particular embodiment, both watchdog timers 210, 212 are configured to operate as a missing pulse detector with a timing period of about 5 milliseconds, just below a 6.6-millisecond-pulse specification for the associated sensor pair. If the watchdog timer's associated sensor pair does not provide a 300-microsecond negative-going pulse within 5 milliseconds (via one of the two op-amps 206), the timing period will complete and the watchdog timer's output 224, 226 will switch from a HIGH (6-volt) state to a LOW (0-volt) state. The LOW state will persist until a negative-going pulse returns.

The output 224 of the first watchdog timer 210 is connected to the selector input 228 of the Data Selector IC 208. As such, the first watchdog timer 210 determines which of the first and second data lines 205, 207 is selected for output from the Data Selector IC 208. When both sensor pairs 112-114, 126-128 are unblocked, the output 224 of the first watchdog timer 210 is in a HIGH state, and the pulsing output of the second sensor pair 126-128 is switched through the Data Selector IC output 230 to the dual sensor module's output terminal 102. If the first sensor pair 112-114 is blocked, the first watchdog timer output 224 switches to a LOW state and the non-pulsing output of the first sensor pair 112-114 is switched through Data Selector IC output 230 to the dual sensor module's output terminal 102. If the second sensor pair 126-128 is blocked, the first watchdog timer 210 remains in a HIGH state and the non-pulsing output of the second sensor pair 126-128 is switched through Data Selector IC output 230 to the dual sensor module's output terminal 102.

It should be noted that the design of the dual sensor module 100 is such that incorrect wiring will not damage the module 100. For example, if the first sensor pair 112-114 is incorrectly wired in a specific way to the dual sensor module's input terminals 246, a LOW input condition will appear on the first watchdog timer output terminal 224. The LOW input condition will cause the first watchdog timer 210 to switch the Data Selector IC output 230 so that the output of the second sensor pair 126-128 is switched through Data Selector IC output 230 to the dual sensor module's output terminal 102. As a result, the pulsed signal of the second sensor pair 126-128 appears on the dual sensor module's output terminal 102.

To prevent this from occurring, the signal from the first sensor pair 112-114 is connected to a high-impedance op-amp 232, which is configured to monitor the incoming positive voltage on the first sensor pair 112-114. If the positive voltage of the first sensor pair 112-114 falls below 3 volts, the op-amp's output 234 will switch from a HIGH state to a LOW state. This in turn causes a transistor 236, with its base 238 connected to the op-amp's output 234 and the collector 240 connected to the Enable terminal 242 of the Data Selector IC 208, to switch OFF. When switched off, a pull-up resistor 244 raises the Data Selector IC enable terminal 242 to a HIGH state, effectively disabling both sensor outputs and presenting a zero voltage state on the Data Selector IC's Output 230. This zero state of output 230 indicates a wiring problem with the circuit of the first sensor pair 112-114.

Figure 4:
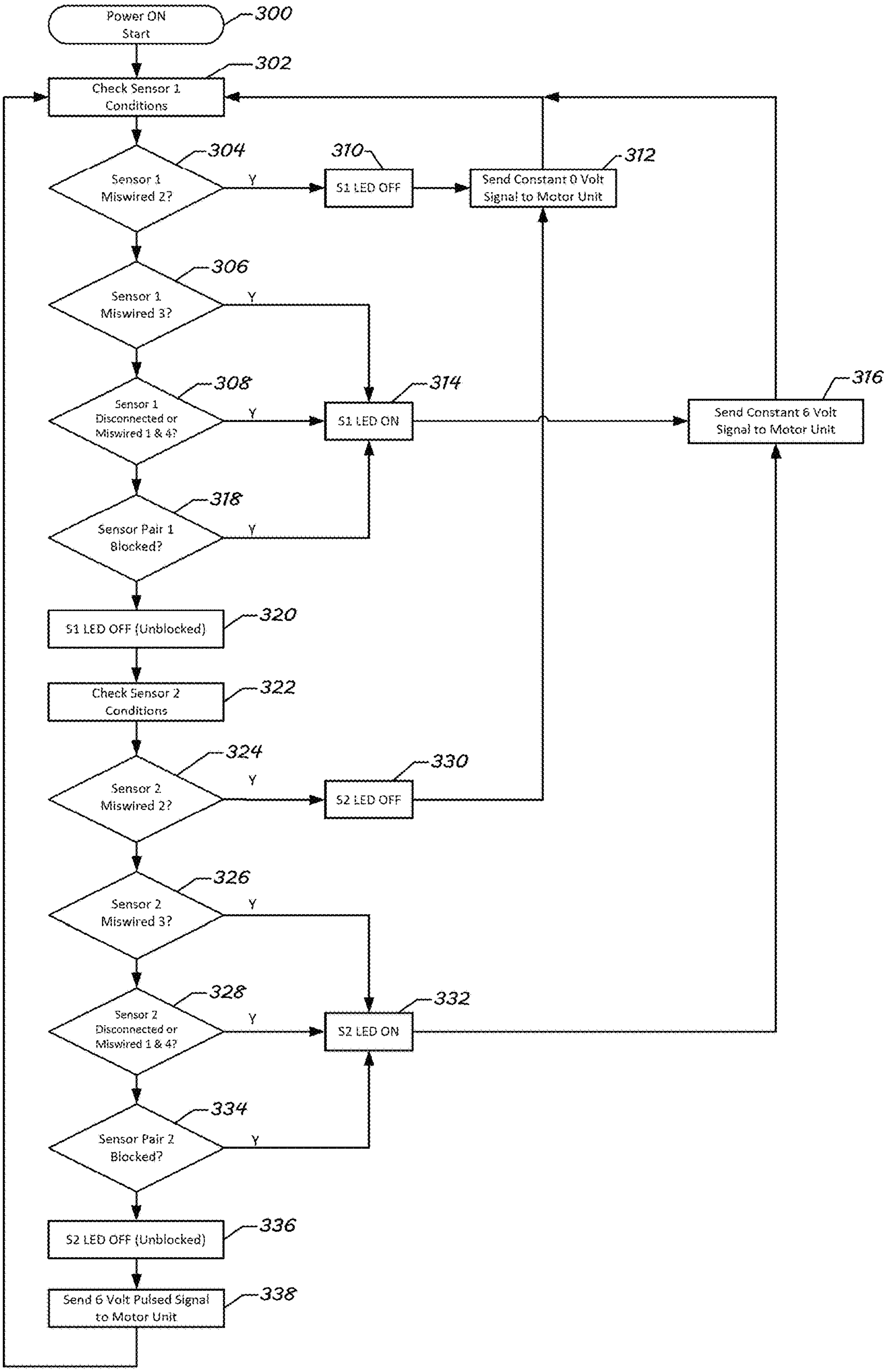
FIG. 4 is a flowchart illustrating a process for operation of the dual sensor module, in accordance with an embodiment of the invention.
Figure 5:
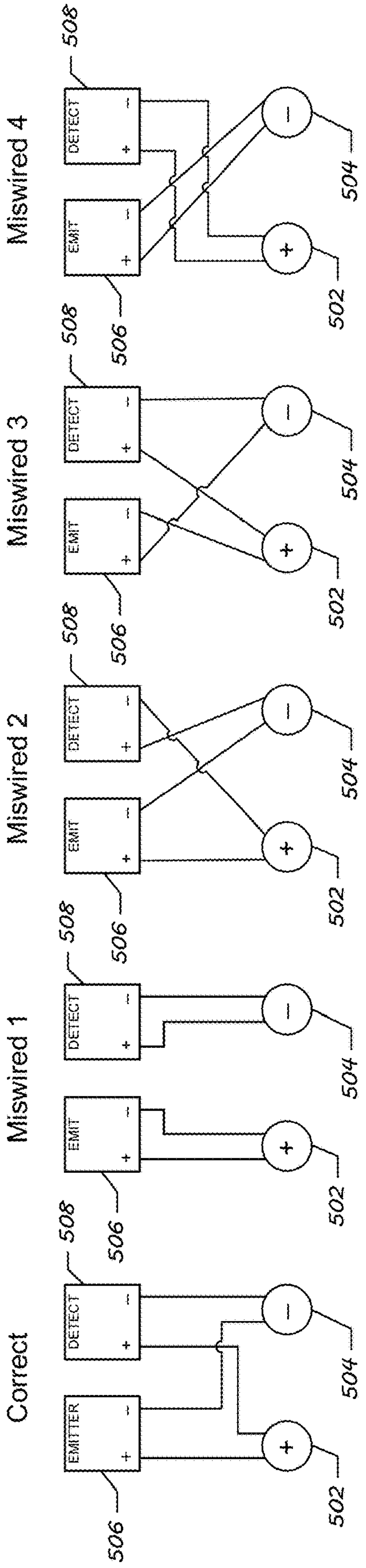
FIG. 5 is a schematic wiring diagram showing possible ways to miswire the dual sensor module.

FIG. 4 is a flowchart illustrating an exemplary process by which the dual sensor module 100 operates. When the dual sensor module 100 is powered on 300, it performs a check of the first sensor conditions 302. In steps 304, 306, 308, the dual sensor module 100 checks for four possible incorrect wiring configurations illustrated schematically in FIG. 5 and described in Table 1 below. FIG. 5 is a schematic diagram showing the various possible connections between positive 502 and negative 504 terminals of the dual sensor module 100 and the sensor emitter 506 and sensor detector 508. Positive terminal 502 corresponds to the third and fifth terminals 110, 118 in FIG. 2, while negative terminal 504 corresponds to the fourth and sixth terminals 116, 124 in FIG. 2. Sensor emitter 506 corresponds to first and second sensor emitters 112, 126 of FIG. 2, while sensor detector 508 corresponds to first and second sensor detectors 114, 128 of FIG. 2.

TABLE 1

| Module Output States | | | |
|---|---|---|---|
| SENSOR | CONDITION | MODULE OUTPUT SIGNAL | LED STATUS |
| S1 & S2 | Unblocked | S2 sensor signal, pulsed | S1 & S2 OFF |
| S1 | Blocked | S1 sensor signal, constant 6 V | S1 ON |
| S2 | Blocked | S2 sensor signal, constant 6 V | S2 ON |
| S1 & S2 | Blocked | S1 sensor signal, constant 6 V | S1 & S2 ON |
| S1 | Disconnected | Constant 6 V | S1 ON |
| S2 | Disconnected | Constant 6 V | S2 ON |
| S1 & S2 | Disconnected | Constant 6 V | S1 & S2 ON |
| S1 & S2 | Miswired 1 & 4 | Constant 6 V | S1 & S2 ON |
| S1 | Miswired 2 | Constant 0 V | S1 OFF |
| S1 | Miswired 3 | Constant 6 V | S1 ON |
| S2 | Miswired 2 | Constant 0 V | S2 OFF |
| S2 | Miswired 3 | Constant 6 V | S2 ON |
| S1 & S2 | Miswired 2 | Constant 6 V | S1 & S2 OFF |
| S1 & S2 | Miswired 3 | Constant 6 V | S1 & S2 ON |

If the dual sensor module 100 determines that that the wiring of the first sensor pair 112-114 is incorrect as shown in the "Miswired 2" portion of FIG. 5 (step 304), the first sensor LED 120 is turned off 310, and a constant zero-volt signal is provided 312 to the dual sensor module's output terminal 102. If the dual sensor module 100 determines that that the wiring of the first sensor pair 112-114 is incorrect as shown in the "Miswired 1", "Miswired 3", or "Miswired 4" portions of FIG. 5 (steps 306, 308), the first sensor LED 120 is turned on 314, and a constant six-volt signal is provided 316 to the dual sensor module's output terminal 102.

Similarly, if the dual sensor module 100 determines that the first sensor pair 112-114 is wired correctly, and further determines that the first sensor pair 112-114 is blocked 318 by some object between the sensor emitter and sensor detector, the first sensor LED 120 is turned on 314, and a constant six-volt signal is provided 316 to the dual sensor module's output terminal 102. If the dual sensor module 100 determines that the first sensor pair 112-114 is wired correctly, and further determines that the first sensor pair 112-114 is unblocked 320, the dual sensor module 100 performs a check of the second sensor conditions 322.

If the dual sensor module 100 determines that the wiring of the second sensor pair 126-128 is incorrect as shown in the "Miswired 2" portion of FIG. 5 (step 324), the second sensor LED 122 is turned off 330, and a constant zero-volt signal is provided 312 to the dual sensor module's output terminal 102. If the dual sensor module 100 determines that the wiring of the second sensor pair 126-128 is incorrect as shown in the "Miswired 1", "Miswired 3", or "Miswired 4" portions of FIG. 5 (steps 326, 328), the second sensor LED 122 is turned on 332, and a constant six-volt signal is provided 316 to the dual sensor module's output terminal 102.

Similarly, if the dual sensor module 100 determines that the second sensor pair 126-128 is wired correctly, and further determines that the second sensor pair 126-128 is blocked 334, the second sensor LED 122 is turned on 332, and a constant six-volt signal is provided 316 to the dual sensor module's output terminal 102. If the dual sensor module 100 determines that the second sensor pair 126-128 is wired correctly, and further determines that the second sensor pair 126-128 is unblocked 334, the second sensor LED 122 is turned off 336 and a pulsed six-volt signal is provided 338 to the dual sensor module's output terminal 102. Then the dual sensor module 100 returns to step 302 and the process repeats.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A dual sensor module for a garage door opener, the dual sensor module comprising:

a plurality of input terminals for at least two sensors configured to detect an object in a path of a garage door;

an output terminal for providing a signal to a motor control unit for the garage door opener wherein the signal prevents the garage door from closing when the object is in the path of the garage door; and a plurality of op-amps, each of the plurality of op-amps coupled to one or more of the plurality of input terminals, wherein each of the plurality of op-amps functions as a buffer between one of the at least two sensors and a circuit of the dual sensor module.

2. The dual sensor module of claim 1, wherein the output terminal is configured to be electrically coupled to a motor control for the garage door.

3. The dual sensor module of claim 1, wherein each of the at least two sensors includes a sensor emitter and a sensor detector.

4. The dual sensor module of claim 1, wherein at least one of the at least two sensors is an optical sensor.

5. The dual sensor module of claim 1, further comprising an LED for each of the at least two sensors, wherein the LED indicates whether the object is in the path of the garage door.

6. The dual sensor module of claim 1, further comprising a transient voltage suppression arrangement electrically coupled to the output terminal, the transient voltage suppression arrangement configured to protect circuitry of the dual sensor module from voltage surges.

7. The dual sensor module of claim 6, wherein the transient voltage suppression arrangement comprises at least one Zener diode coupled between ground and the output terminal.

8. The dual sensor module of claim 1, wherein each op-amp has an output coupled to a watchdog timer that is configured to detect a pulse from the op-amp output to which the watchdog timer is coupled, and wherein an output of the watchdog timer changes if the pulse is not detected.

9. The dual sensor module of claim 1, further comprising circuitry configured to determine if the object is blocking one of the at least two sensors.

10. The dual sensor module of claim 9, wherein the circuitry includes a data selector integrated circuit whose output is coupled to the output terminal.

11. The dual sensor module of claim 1, further comprising at least one input terminal for supply of electrical power to the dual sensor module.

12. A garage door sensor system comprising:

a dual sensor module that includes a plurality of input terminals for at least two sensors configured to detect an object in a path of a garage door, an output terminal for providing a signal to a motor control unit for a garage door opener wherein the signal prevents the garage door from closing when the object is in the path of the garage door, and a plurality of op-amps, each of the plurality of op-amps coupled to one or more of the plurality of input terminals, wherein each of the plurality of op-amps functions as a buffer between one of the at least two sensors and a circuit of the dual sensor module;

a first sensor emitter and first sensor detector electrically coupled to one or more of the plurality of input terminals; and a second emitter and second sensor detector electrically coupled to one or more of the plurality of input terminals not coupled to the first sensor emitter and first sensor detector;

wherein the first sensor emitter and first sensor detector are positioned at a first location along the path of the garage door, and the second emitter and second sensor detector are positioned at a second location along the path of the garage door, wherein the first location is different from the second location.

13. The garage door sensor system of claim 12, wherein at least one of the plurality of input terminals is configured to connect to one or more wires coupled to the first sensor emitter and first sensor detector or to the second emitter and second sensor detector.

14. The garage door sensor system of claim 12, wherein the output terminal is configured to connect to one or more wires coupled to the motor control unit for the garage door.

15. The garage door sensor system of claim 12, wherein the first sensor emitter and the first sensor detector form an optical sensor.

16. The garage door sensor system of claim 15, wherein the second sensor emitter and the second sensor detector form an optical sensor.

* * * * *